(12) United States Patent
Stein

(10) Patent No.: US 9,729,077 B2
(45) Date of Patent: Aug. 8, 2017

(54) FRONT END PROTECTION POWER CONTROLLER

(71) Applicant: Graco Minnesota Inc., Minneapolis, MN (US)

(72) Inventor: Nicholas J. Stein, Rogers, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 164 days.

(21) Appl. No.: 14/598,759

(22) Filed: Jan. 16, 2015

(65) Prior Publication Data
US 2016/0211764 A1   Jul. 21, 2016

(51) Int. Cl.
*H02M 7/06* (2006.01)
*H02H 3/20* (2006.01)

(52) U.S. Cl.
CPC ............... *H02M 7/06* (2013.01); *H02H 3/20* (2013.01)

(58) Field of Classification Search
CPC ............ H02M 7/02; H02M 7/04; H02M 7/06; H02M 7/062; H02M 7/066; H02M 7/12; H02M 7/125
See application file for complete search history.

(56) References Cited

U.S. PATENT DOCUMENTS

| | | | | |
|---|---|---|---|---|
| 4,568,877 A | * | 2/1986 | Tinsley | G01R 19/155 323/266 |
| 2004/0210349 A1 | | 10/2004 | Lenz et al. | |
| 2006/0274468 A1 | * | 12/2006 | Phadke | H02M 7/125 361/93.1 |
| 2010/0156518 A1 | | 6/2010 | Hoque et al. | |
| 2013/0119958 A1 | * | 5/2013 | Gasperi | H02M 1/10 323/299 |
| 2013/0300387 A1 | * | 11/2013 | Louvel | H02M 7/2176 323/282 |
| 2014/0111113 A1 | * | 4/2014 | Del Carmen, Jr. | H02M 3/158 315/297 |
| 2014/0247522 A1 | | 9/2014 | Simi | |
| 2015/0054355 A1 | * | 2/2015 | Ben-Shalom | H04B 5/0037 307/104 |
| 2015/0357983 A1 | * | 12/2015 | Choi | H03G 1/0035 330/254 |
| 2016/0116925 A1 | * | 4/2016 | Freeman | H02M 3/33546 307/130 |
| 2016/0174318 A1 | * | 6/2016 | Mignano | H05B 33/0845 315/201 |

FOREIGN PATENT DOCUMENTS

JP  2012238693 A  12/2012
WO  WO2008039293 A2  4/2008

OTHER PUBLICATIONS

Written Opinion and International Search Report, for PCT No. PCT/US2016/012817, dated May 9, 2016, 9 pages.

* cited by examiner

*Primary Examiner* — Jeffrey Gblende
*Assistant Examiner* — David A. Singh
(74) *Attorney, Agent, or Firm* — Kinney & Lange, P.A.

(57) ABSTRACT

A power controller monitors and controls supply of AC power to a load. A power supply derives DC power supply voltages from the input AC power. The power supply includes power dissipation circuit that dissipates excess power as a function of one of the supply voltages. A voltage sensing circuit provides a voltage sense signal that is a function of the voltage of the input AC power. A digital processor controls a switch that connects a load to the AC power based upon the voltage sensed signal.

20 Claims, 1 Drawing Sheet

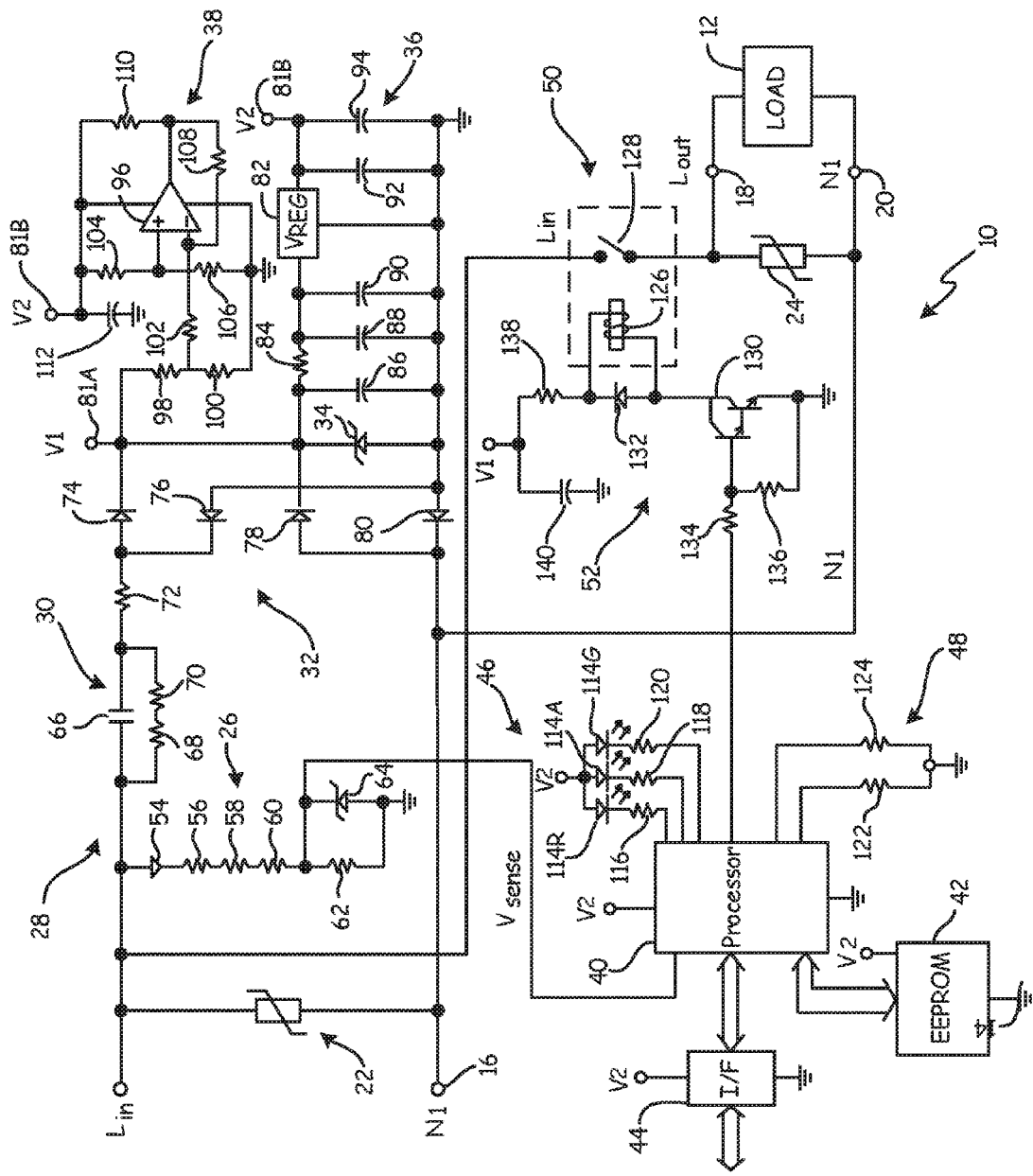

FRONT END PROTECTION POWER CONTROLLER

BACKGROUND

Electrical systems and machinery may be operated using alternating current (AC) power or direct current (DC) power. Power controllers can be used to connect and disconnect electrical loads to AC or DC input power. Power controllers often make use of a switch, such as a relay or a solid state switch connected between the source of input power and the load. A processor controls the operation of the switch to connect the load to input power when the load is to be operated and to disconnect the load under certain conditions. For example, the power controller may disconnect a load when the input power is at levels that could damage the load.

SUMMARY

A power controller that monitors and controls supply of AC power to a load includes a power supply for deriving first and second supply voltages from input AC power, a switch for connecting the load to the input AC power, a voltage sensing circuit that provides a voltage sense signal that is a function of voltage of the input AC power, and a digital processor that controls the switch based upon the voltage sense signal. The power supply includes a voltage limiter, a rectifier bridge, first and second voltage regulators, and a power dissipation circuit. The first voltage regulator produces first supply voltage based upon power that has been voltage limited and rectified. The second voltage regulator derives a second supply voltage from the first supply voltage. The power dissipation circuit dissipates power as a function of the first supply voltage.

BRIEF DESCRIPTION OF THE DRAWINGS

FIG. 1 is an electrical schematic diagram of a front end protection power controller with a power dissipation circuit to protect a power supply that supplies voltages used to operate the power controller.

DETAILED DESCRIPTION

FIG. 1 is an electrical schematic diagram showing front end protection power controller 10, which controls the supply of input AC power to load 12. Power controller 10 includes input terminals 14 and 16 that receive input AC power, such as the electrical power from a power utility distribution system. Power controller 10 also includes output terminals 18 and 20, which are connected to load 12. Power controller 10 monitors the AC power received at terminals 14 and 16, and determines when AC power can be safely supplied at output terminals 18 and 20 to load 12.

The power supplied to load 12 is the AC line voltage received at terminals 14 and 16. Conditioning of the AC power supplied to load 12 is provided by metal-oxide varistor (MOV) 22 connected between terminals 14 and 16 and MOV 24 connected between output terminals 18 and 20. MOV 22 and MOV 24 remove spikes present in the AC power, but do not alter the waveform or step down or step up the AC voltage supplied to load 12.

Power controller 10 includes voltage sense circuit 26, power supply circuit 28 (which includes voltage limiter circuit 30, rectifier bridge 32, zener diode 34, voltage regulator 36, and power dissipation circuit 38), digital processor 40, EEPROM 42, communication interface 44, indicator circuitry 46, resistive load circuit 48, relay 50, and relay driver circuit 52. Voltage sense circuit 26 produces a voltage sense signal (Vsense) that is a function of the AC voltage at input 14. Voltage sense circuit 26 includes diode 54, resistors 56, 58, 60, and 62, and zener diode 64. Diode 54 half wave rectifies the AC voltage at terminal 14. That rectified voltage is divided by the resistor chain formed by resistors 56, 58, 60, and 62. Vsense is the voltage between the junction of resistors 60 and 62 and ground. Zener diode 64 limits Vsense, so that the voltage received by processor 42 is within a range that can be sensed and converted to a digital value by processor 40.

Power supply circuit 28 derives supply voltages V1 and V2 and the electrical ground used by processor 40, EEPROM 42, indicators circuitry 46, resistive load circuit 48, and relay driver 52. Voltage V1 is used by relay drive circuit 50. Supply voltage V2 is used by the electronic circuitry of power dissipation circuit 38 as well as processor 40, EEPROM 42, communication interface 44, indicator circuitry 46, and resistive load circuit 48.

Voltage limiter circuit 30 is a capacitive limiter that includes capacitor 66 and resistors 68, 70, and 72. Voltage limiter circuit 30 is connected between input terminal 14 and rectifier bridge 32. The reactance of capacitor 66 limits the voltage that is applied to rectifier bridge 32.

Rectifier bridge 32 is a full wave rectifier bridge formed by diodes 74, 76, 78, and 80. The anode of diode 74 and the cathode of diode 76 are connected to the output of voltage limiter 30 at resistor 72. The anode of diode 76 and the anode of diode 80 are connected together to electrical ground. The cathode of diode 80 and the anode of diode 78 are connected to input terminal 16. The cathode of diode 74 is connected to supply voltage terminal 81A.

The anode of zener diode 34 is connected to ground, and the cathode of zener diode 34 is connected to first supply terminal 81A. The breakdown characteristic of zener diode 34 determines the maximum voltage level of supply voltage V1. In one embodiment, V1 has a maximum voltage of about 27 volts.

Voltage regulator 36 produces second supply voltage V2 at supply voltage terminal 81B. Voltage regulator 36 is connected between the anode and cathode housing of diode 34, and includes integrated circuit linear voltage regulator 82, resistor 84, and capacitors 86, 88, 90, 92, and 94. Resistor 84 and linear voltage regulator 82 provide a voltage drop between terminals 81A and 81B that is equal to the difference between voltages V1 and V2.

Power dissipation circuit 38 is connected to first supply voltage terminal 81A, and is powered by second supply voltage V2. Power dissipation circuit 38 includes operational amplifier (op amp) 96, resistors 98, 100, 102, 104, 106, 108, and 110, and capacitor 112. The non-inverting (+) input of op amp 96 receives a reference voltage from a voltage divider formed by resistors 104 and 106. The inverting input of op amp 96 receives a signal that is a function of voltage V1. Resistors 98 and 100 form a voltage divider between terminal 81A and ground. The voltage from resistors 98 and 100 is supplied to resistor 102 to the inverting input of op amp 96. Feedback resistor 108 is connected to the output of op amp 96 to the inverted input. Power dissipation resistor 110 is connected between the output of op amp 96 and supply voltage V2.

Processor 40 is a programmable digital processor. In one embodiment, processor 40 is a microchip PIC microcontroller. In other embodiments, processor 40 may be a microprocessor, a programmable logic controller, a programmable gate array, a digital signal controller, an application specific integrated circuit (ASIC) or other programmable digital device. Processor 40 receives the Vsense signal as an input, and determines whether the voltage of the AC power appearing at input terminals 14 and 16 is within a range that is safe for supplying to load 12. If Vsense indicates that the voltage is within a safe range, processor 40 provides an output to relay drive circuit 52 to energize relay 50 so that the AC power can be supplied through output terminals 18 and 20 to load 12.

Associated with processor 40 is EEPROM 42. EEPROM 42 can store digital programming used by processor 40. In addition, it can be used to store operational data. For example, EEPROM 42 can be used to record whenever an over-voltage event occurs. It can record the duration of the over-voltage event, the highest voltage recorded, how many cycles power has been turned on to load 12, and so on.

Communication interface 44 provides communication between processor 40 and other digital devices. For example, communication interface 44 could be used by a computer or other programming device to provide programming instructions to processor 40. Port 44 may also be used, for example, for deriving operational data that has been stored in EEPROM 42.

Indicator circuit 46 includes light emitting diodes (LED) that are used to indicate operating condition of power controller 10. In the embodiment shown in FIG. 1, indicator circuit 46 includes red light emitting diode 114R, amber light emitting diode 114A, and green light emitting diode 114G, along with resistors 116, 118, and 120. Processor 40 can control light emitting diodes 114R, 114A, and 114G to indicate the state of operation of processor 40 (or power controller 10).

Resistive load circuit 48 includes two load resistors 122 and 124 that can be used by processor 40 to provide additional power dissipation. When processor 40 determines that Vsense is approaching its maximum value, which indicates that the AC voltage at input terminals 14 and 16 is increasing, processor 40 can drive current through resistors 122 and 124 to dissipate additional power being encountered by power supply circuit 28.

Relay 50 includes relay coil 126 and relay contacts 128. Line input power from terminal 14 is connected through contacts 128, when they are closed, to output terminal 18. That output voltage appears as line output voltage Lout.

In FIG. 1, contacts 128 of relay 50 are shown as normally open contacts. They will close when coil 126 is energized, and will open when coil 126 is deenergized.

Relay driver circuit 52 controls whether current is supplied or not supplied through coil 126. Relay driver circuit 52 includes Darlington transistor 130, diode 132, resistors 134, 136, and 138, and capacitor 140. Circuit 52 uses supply voltage V1 in order to provide the current level required by coil 126 to close contacts 128.

Power controller 10 includes a variable power dissipation feature that allows it to operate over a wider range of AC input voltages without damaging power supply circuit 28. The variable power dissipation is provided through power dissipation circuit 38 in conjunction with second power supply circuit 36. In addition, processor 40 can also provide further power dissipation through resistive load circuit 48. The power consumed by processor 40 and resistive load circuit 48 reduces power that would otherwise be dissipated by zener diode 34, because processor 40 operates based upon second supply voltage V2 derived from supply terminal 81B.

The need for power dissipation in power supply circuit 28 is to protect zener diode 34, which is connected to full wave rectifier bridge 32. As the AC voltage at input terminals 14 and 16 increases, the voltage between supply terminal 81A and ground will increase until zener diode 34 reaches its breakdown voltage. If the voltage being supplied through rectifier 32 continues to increase, zener diode 34 will limit the voltage at terminal 81A, and will conduct more and more current. At some point, the current flowing through zener diode 34 can increase to a point where zener diode 34 is damaged or destroyed.

Power dissipation circuit 38 helps to reduce the amount of current flowing through zener diode 34 by monitoring voltage V1 at supply terminal 81A. Resistors 98 and 100, which form a voltage divider, are connected in parallel with zener diode 34 between terminal 81A and ground. The voltage from the voltage divider is supplied to the inverting input of op amp 96. Under normal conditions, the voltage at the inverting input of op amp 96 will be less than the reference voltage established at the non-inverting input by the voltage divider formed by resistors 104 and 106, so that op amp 96 is saturated. As a result, the output of op amp 96 will be high (equal to V2) and current will not be flowing through resistor 110. As the line voltage increases and the voltage across zener diode 34 increases to near its zener breakdown voltage, the output of op amp 96 decreases from V2 and current begins to flow through resistor 110. As the voltage at the inverting input of op amp 96 rises with the rising voltage at terminal 81A, the output voltage of op amp 96 decreases toward ground and the amount of current flowing through resistor 110 from voltage V2 (supply terminal 81B) increase. Voltage regulator circuit 36 draws more current to maintain supply voltage V2 at its regulated value. That additional current is drawn from terminal 81A through resistor 84 and linear voltage regulator 82. Thus, power dissipation by circuit 38 produced by current flow through resistor 110 also results in additional power dissipation within linear voltage regulator 82 and resistor 84 of voltage regulator 36. This results in current being drawn away from the cathode of zener diode 34, and reduces the amount of power being dissipated in zener diode 34. As a result, the power dissipation that is provided by circuits 38, 36, and 48 all cooperate to define the level of line voltage that power supply circuit 28 (an in particular zener diode 34) can withstand.

Power controller 10 offers a wider useful input voltage range through the use of voltage dependent power dissipation. This is achieved by providing a way to keep the increased need for power dissipation away from zener diode 34 as the line voltage increases.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A power controller that monitors and controls supply of AC power to a load, the power controller comprising:
   a power supply circuit that derives a first supply voltage from input AC power and derives a second supply voltage from the first supply voltage, the power supply circuit including a power dissipation circuit;

a voltage sensing circuit that provides a voltage sense signal that is a function of voltage of the input AC power;

a switch powered by the first supply voltage for connecting a load to the input AC power; and a digital processor powered by the second supply voltage for controlling the switch based upon the voltage sense signal;

wherein the power supply circuit comprises:
a voltage limiter circuit connected to receive the input AC power;
a rectifier circuit connected to the voltage limiter circuit;
a first voltage regulator connected to the rectifier circuit to produce the first supply voltage; and
a second voltage regulator connected to the first voltage regulator to produce the second supply voltage;

wherein the power dissipation circuit is powered by either of the first or second supply voltage; and wherein power dissipation circuit includes an amplifier that controls flow of current through a power dissipation resistor as a function of a difference between a voltage derived from the first supply voltage and a reference voltage.

2. The power controller of claim 1, wherein the first voltage regulator is a zener diode.

3. The power controller of claim 2, wherein the first supply voltage is provided at a first supply terminal, and wherein the second voltage regulator includes a resistor and a linear voltage regulator connected between a cathode of the zener diode and a second supply terminal at which the second supply voltage is provided.

4. The power controller of claim 3, wherein the cathode of the zener diode is connected to the first supply terminal.

5. The power controller of claim 4, wherein the amplifier has a first input, a second input, and an output, and the power dissipation resistor is connected between the second supply terminal and the output of the amplifier.

6. The power controller of claim 5, wherein the first input is connected to a first voltage divider circuit connected between the first supply terminal and ground, and the second input is connected to a second voltage divider circuit connected between the second supply terminal and ground.

7. The power controller of claim 1, wherein the voltage sensing circuit includes a diode in series with a voltage divider.

8. The power controller of claim 1, wherein the switch comprises a relay having relay contacts and a relay coil.

9. The power controller of claim 8, wherein the digital processor controls the switch through a relay coil driver circuit that is connected to the relay coil and is powered by the first supply voltage.

10. The power controller of claim 9, wherein the relay contacts are connected between a terminal that receives the input AC power and an output that is connected to the load.

11. The power controller of claim 1, wherein the digital processor controls flow of current from the power supply circuit through a resistive load circuit as a function of the voltage sense signal.

12. A method of controlling supply of input AC power to a load, the method comprising:
sensing voltage of the input AC power;
controlling connection of the load to the input AC power as a function of the voltage sensed;
deriving a first DC supply voltage from the input AC power with a rectifier circuit;
limiting the first DC supply voltage using a voltage regulator; and
dissipating power to protect the voltage regulator from exposure to excessive power with a power dissipation circuit, wherein dissipating power comprises:
flowing current through a power dissipation resistor; and
controlling the current through the power dissipation resistor as a function of a difference between a voltage derived from the first supply voltage and a reference voltage.

13. The method of claim 12, wherein the voltage regulator is a zener diode.

14. A power controller that monitors and controls supply of AC power to a load, the power controller comprising:
a power supply circuit that derives supply voltages from input AC power, the power supply circuit including:
a voltage limiter circuit connected to receive the input AC power;
a rectifier circuit connected to the voltage limiter circuit;
one or more regulators to produce the supply voltages;
a power dissipation circuit that is powered by one of the supply voltages includes a device that controls flow of current through a power dissipater as a function of a difference between a voltage derived from one of the supply voltages and a reference voltage; and
a voltage sensing circuit that provides a voltage sense signal that is a function of voltage of the input AC power;
a switch powered by one of the supply voltages for connecting a load to the input AC power; and
a logic circuit for controlling the switch based upon the voltage sense signal.

15. The power controller of claim 14 wherein the one or more regulators comprises:
a first regulator that produces a first supply voltage; and
a second regulator that produces a second supply voltage.

16. The power controller of claim 15 wherein the first regulator comprises a Zener diode and the second regulator comprises a linear voltage regulator.

17. The power controller of claim 16, wherein the first supply voltage is provided at a first supply terminal, and the linear voltage regulator is connected between a cathode of the zener diode and a second supply terminal at which the second supply voltage is provided.

18. The power controller of claim 17, wherein the cathode of the zener diode is connected to the first supply terminal, wherein the device that controls flow of current has a first input, a second input, and an output, and the power dissipater is connected between the second supply terminal and the output of the device, and wherein the first input is connected to a first voltage divider circuit connected between the first supply terminal and ground, and the second input is connected to a second voltage divider circuit connected between the second supply terminal and ground.

19. The power controller of claim 14, wherein the voltage sensing circuit includes a diode in series with a voltage divider.

20. The power controller of claim 14, wherein logic circuit controls flow of current from the power supply circuit through a resistive load circuit as a function of the voltage sense signal.

* * * * *